United States Patent
Schaefer

(10) Patent No.: US 7,540,890 B2
(45) Date of Patent: Jun. 2, 2009

(54) CREOSOTE AND SOOT DESTROYING FIRE LOG

(76) Inventor: Clark Schaefer, 7722 - 21st NE., Seattle, WA (US) 98115

( * ) Notice: Subject to any disclaimer, the term of this patent is extended or adjusted under 35 U.S.C. 154(b) by 493 days.

(21) Appl. No.: 10/790,499

(22) Filed: Mar. 1, 2004

(65) Prior Publication Data

US 2004/0168366 A1   Sep. 2, 2004

Related U.S. Application Data

(60) Provisional application No. 60/450,971, filed on Feb. 28, 2003.

(51) Int. Cl.
   *C10L 10/00* (2006.01)
(52) U.S. Cl. ............... 44/640; 44/641; 44/535; 44/589; 44/590; 44/606
(58) Field of Classification Search ............ 44/535, 44/589, 590, 606, 640, 641
   See application file for complete search history.

(56) References Cited

U.S. PATENT DOCUMENTS

| | | | |
|---|---|---|---|
| 2,215,536 A * | 9/1940 | Bette-Bennett | 44/575 |
| 2,777,761 A | 1/1957 | Tarnoski | 44/5 |
| 3,297,419 A | 1/1967 | Eyre, Jr. | 44/6 |
| 3,637,355 A | 1/1972 | Brockbank | 44/1 R |
| 4,147,518 A | 4/1979 | DeHart et al. | 44/13 |
| 4,481,010 A | 11/1984 | Mackowiak et al. | 44/5 |
| 5,284,636 A | 2/1994 | Goff et al. | 423/235 |
| 5,882,365 A | 3/1999 | Farjon et al. | 44/535 |
| 2004/0045215 A1 * | 3/2004 | Guilfoyle | 44/577 |
| 2004/0088912 A1 * | 5/2004 | Madamour | 44/640 |

FOREIGN PATENT DOCUMENTS

WO    WO 02/46337    *    6/2002

* cited by examiner

*Primary Examiner*—Cephia D Toomer
(74) *Attorney, Agent, or Firm*—Clark A. Puntigam; Jensen & Puntigam, P.S.

(57) ABSTRACT

A processed solid fuel composition incorporating agents for destroying creosote and soot within flue ducts and chimneys of fireplaces, solid fuel stoves and other heating devices is disclosed, along with a method for its manufacture and a method for its use. The composition is made up of a combination of compressed cellulosic particulate material and a chemical and/or catalytic creosote and soot removing agent, and is molded in the form of a fire log in the preferred embodiment. The composition may be used alone, but is ideally applied to an active fire to treat a chimney flue by combined heating and chemical disaggregation of accumulated creosote and soot deposits.

11 Claims, No Drawings

CREOSOTE AND SOOT DESTROYING FIRE LOG

CROSS-REFERENCE TO RELATED APPLICATION

This application claims benefit of U.S. Provisional Application Ser. No. 60/450,971 entitled Creosote and Soot Destroying Fire Log, filed Feb. 28, 2003.

FIELD OF INVENTION

This invention relates to processed solid fuel compositions, and more particularly to processed fireplace logs incorporating agents for destroying creosote and soot within flue ducts and chimneys of fireplaces, solid fuel stoves and other heating devices.

BACKGROUND OF THE INVENTION

Creosote in the present disclosure is intended to mean deposits of any kind that form in heating devices and particularly in chimney flues. These deposits are typically particles of carbonaceous materials, flying ash or chiefly tars. The latter settle mainly in the lower portion of the flue ducts or chimneys. Formation and settling of these materials are dramatically increased when burning sold fuels such as coal and wood, particularly when using air-tight stoves.

The increased settling of these materials, especially tars, in chimneys is dangerous since these materials are flammable and can be responsible for fires in chimneys. They are also responsible for a decreased draft in chimneys and combustion devices since they decrease the flue section. Conventional sweeping with a flue brush is not effective with tars, which form a hard layer strongly adhered to the walls, so that even after mechanical sweeping a fire in the chimney can still occur.

Materials for the so-called chemical or catalytic cleaning of chimneys are replete on the market. Some of these contain sulfur whose purpose is to decompose soot and tars to make them more flammable. However, because the flue must be heated to a maximum to make the material operative, use of such products creates risks such as a fire in the chimney or damage to the flue through use of caustic soda or decomposition products thereof.

The scientific literature and patents disclose many other chemical or catalytic agents intended to inhibit the settling of deposits in furnaces and chimneys or even to disaggregate these deposits once formed; these agents unhappily cannot be handled easily in many cases, particularly when present as a liquid or a powder. The liquid agents require injection nozzles and their use is not feasible with domestic heating devices; the powdered agents cannot be used easily since a powder in more or less precise dosage must be sprinkled onto a fire of variable intensity, whose measure and control cannot be carried out easily.

Finally a large portion of the powder or decomposition products is lost in the atmosphere, which results in economic losses and pollution hazards.

Manufactured logs for domestic use have not been entirely satisfactory either in burn characteristics or in costs. The main advantages of processed fire logs generally include long burn time, easy lighting characteristics, and convenience of use for preparation or maintenance of a fire. As a replacement to natural wood fires, processed logs offer the convenience of not having to stoke the fire to ensure a consistent flame. One log typically burns for 2 to 4 hours, depending on the size of log. However, these advantages are not unqualified. In order to achieve both a substantial flame and a quick ignition time, a significant amount of wax has been used. The high combustion rate in combination with a limited air supply available in most modern houses typically results in incomplete combustion, which in turn leads to a buildup of soot and creosote in the flue. Repeated use of such fire logs can thus create a fire hazard. In fact, due to the seriousness of this problem, insurance companies recommend that consumers alternate between the use of processed fire logs and natural wood fires, in addition to frequent cleaning of combustion apparatus.

Not only does the excessive use of wax represent a safety hazard due to the build-up of soot, it also means that the consumer is provided with an aesthetically less pleasing product as compared to natural wood fires. While the substantial use of wax promotes faster ignition, the flame height for the later stages of combustion is significantly lower than when a fire log is first lit. Consequently, it is difficult for a user to enjoy a flame comparable to a well-maintained natural wood fire.

A further disadvantage of fire logs high in wax content is the pollution produced during combustion. The volatility of wax causes a fast, sooty initial burn that ejects copious amounts of combustion by-products including soot and carbon monoxide that is released into the atmosphere. In addition, some prior art manufactured fire log compositions contain substances which are toxic or potentially toxic when combusted. Thus, there exists a need for a safe, clean burning fire log that maintains good flame consistency over an extended period of time.

A further disadvantage of fire logs high in wax content is that their use can void the warranty of the wood burning appliance. Also, according to published data, fire logs high in wax content are intended to be burned in fireplaces only.

FR-A-2 554 458 discloses a solid combustible agent for preventing or curing soot in heat generating devices. The agent comprises e.g., wood particles, a soot preventing or curing agent and a binder. The agent is used in an active conventional fire in low proportion, e.g. a few tens of grams of active material per each metric ton of fuel.

The use of wax as a binder for sawdust in artificial logs is known from U.S. Pat. No. 4,147,518, 3,297,419 and 3,637,355. Chemicals in minor proportions may be added to improve the combustion or produce colored flames, but the resulting logs do not appear to have any effect on soot or tars in chimney flues.

U.S. Pat. No. 5,882,365 discloses a soot disaggregating combustible agent comprising an aggregate of cellulosic particulate material, chemical and/or catalytic soot disaggregating agent and a binder.

GB-A-2 145 731 discloses cellulose briquettes incorporating combustion modifiers such as sulfur oxyacid derivatives or phosphorus oxyacid derivatives.

GB-A-1 001 772 discloses a cleaning agent for heat transfer surfaces which comprises a mixture of potassium nitrate and a combustible material. This agent is introduced into a hot furnace.

U.S. Pat. No. 4,481,010 discloses a creosote and soot removing composition comprising a metallic chloride and trisodium phosphate, said composition being sprinkled onto a fire.

U.S. Pat. No. 2,777,761 discloses a composition comprising ammonium chloride, copper sulfate and wood flour that assists in the burning of soot and carbon deposits in combustion chambers, flues, etc.

WO-A-82 04065 discloses a process for removing soot from enclosed spaces comprising the introduction of steam saturated with specific chemicals.

U.S. Pat. No. 5,284,636 discloses the use of phosphorous oxide to stabilize the ash produced by the combustion of a heavy metals containing fuel.

DE-A-3 429 584 discloses a combustion improving composition comprising a number of chemicals including ammonium compounds which are said to clean heating devices and flues.

While a number of soot inhibiting or soot removing (disaggregating) agents have been disclosed, it appears that none of them has been used in the same composition or in the same manner as in the present invention.

The disadvantages of the cleaning agents of the prior art are largely overcome by the use of a solid cleaning agent for disaggregating soot according to the present invention, particularly the use of the preferred embodiment of this agent.

OBJECTS OF THE INVENTION

It is an object of the invention to provide an improved creosote and soot destroying solid fuel fire log.

It is another object of the invention to provide an improved creosote and soot removing composition having reduced corrosive effect on metal flue pipe material of wood burning stoves.

It is a further object of the invention to provide a lesser polluting solid fuel fire log.

It is an object of the invention to provide a solid fuel fire log that is to be used on an active fire.

It is an object of the invention to provide a solid fuel fire log that reduces the risk of a fire hazard.

It is an object of the invention to provide a solid fuel fire log that is neither toxic nor potentially toxic when combusted.

It is an object of the invention to provide a creosote destroying solid fuel fire log that contains no wax.

It is a further object of the invention to provide a solid fuel fire log that will not void the warranty of a wood burning appliance.

BRIEF SUMMARY OF THE INVENTION

The invention is based on a new concept of manufacturing a solid, combustible material incorporating an agent for destroying creosote and soot. When this material is combusted, particularly in the presence of an previously ignited fire, the agent for destroying creosote is progressively released and comes into contact with the creosote and soot. In accordance with a further aspect of the invention, an improved composition having reduced corrosive effect on ferrous metals, such as steel and iron, galvanized steel, black iron and flue pipe grades of stainless steel is provided. In accordance with a further aspect of the invention, an improved composition having no wax, as opposed to prior art sawdust/wax fire logs, provides a cleaner burning and more aesthetic product.

The creosote-destroying agent according to the present invention consists of a solid aggregate comprising essentially a solid particulate combustible material, component (a), and a chemical and/or catalytic agent, component (b), that is capable of destroying creosote and/or soot. These components are preferably present in a substantially homogeneous admixture, although there can be successive layers of components (a) and (b), or alternatively a final superficial coating of the mixture with the component (a) or (b) alone or any combined mixture of (a) and (b). In another embodiment the whole component (b) is arranged in the center of the composition or along the central axis thereof.

The creosote destroying fire log of the present invention offers a number of advantages over prior art cleaning fire logs. The present invention does not require the burning of the cleaning log on a "stand-alone" basis. It can thus be used more easily by users, particularly those who rely on a wood stove as their primary source of heat. The fire log of the present invention also performs better since the active material is released smoothly and continuously throughout the duration of combustion giving the active agent ample time to treat the creosote. Combustion of the cleaning agent heats the creosote up to a temperature whereby an efficient treatment is provided. Cleaning is thus obtained more quickly than when using any of the previously known chemical and/or catalytic processes.

Because the present invention contains no wax, it is suitable for combustion in all wood burning appliances. Unlike the use of fire logs high in wax content, use of the present invention with its wax-less composition will not void the warranty of a wood burning appliance.

DETAILED DESCRIPTION OF THE INVENTION

The solid particulate combustible cellulose material preferably consists of wood particles such as sawdust, powder, chips, fibers or the like. Other combustible cellulosic materials can be used as well, such as crushed or ground cereal straw, crushed and dried residues from certain town refuses, (vegetal residues) or residues from paper mills. The size of the particles is usefully between 0.1 and 10 mm for sawdust and wood meal. Other materials may be of greater length (chips or fibers) but are preferably from 0.1 to 2 mm thick.

The chemical and/or catalytic creosote destroying agent may be any agent know for that purpose. These agents can be found in large number in the scientific literature and patents. A non-limiting list of these agents comprises ammonium salts such as ammonium chloride, nitrate, acetate or sulfate, potassium and/or magnesium acetate and nitrate, phosphates such as ammonium phosphates and alkali and alkaline earth metal phosphates, alkali and alkaline earth metal carbonates, oxides and hydroxides, such as for example those of sodium, potassium, calcium and ammonium. Compounds of multivalent metals such as copper, manganese, iron and cerium may have a catalytic effect and are thus useful in this invention, e.g. from 0.1 to 2% by weight thereof. These compounds may be used as such or as mixtures.

Examples of such mixtures are:

A mixture of potassium nitrate and ammonium sulfate (1:10 to 10:1 by weight),

A mixture of ammonium sulfate and magnesium chloride (2:10 to 10:2 by weight),

A mixture of dicalcium phosphate, ammonium chloride, iron sulfate and calcium nitrate, A mixture of ammonium phosphate, ammonium sulfate and copper nitrate, A mixture of potassium acetate and magnesium nitrate, A mixture of metallic chloride and trisodium phosphate dodecylhydrate.

The way the creosote destroying agent (element b according to the invention) operates depends somewhat on the selected agent. It is apparent that these agents facilitate the conversion of the tarry deposits to powdered and poorly adherent ashes that separate more easily. It is thought that the mechanism is mainly chemical but the optional metal compounds such as iron, copper or manganese compounds may have a catalytic effect.

In a preferred embodiment, fire logs are formed by application of pressure to a admixture of the elements (a) and (b) to form a physically bound combination. Ideally, the pressure applied is between 10,000 and 20,000 p.s.i.

The relative proportions of the elements (a and b) and pressure may vary broadly depending on the particular nature of each element in the composition, its porosity, its combustibility and the efficiency of the creosote destroying agent.

The relative proportions by weight are in the range of 50 to 99.9% of (a) and 50 to 00.1% of (b) for 100 parts of the mixture. Additional materials may be added such as carriers, e.g. silica or silicates, combustion additives, or other aesthetic modifying agents, e.g. a dye or pigment. The amount by weight will remain below half the proportion of (a+b) and will be preferably below 5% of this proportion.

The following proportions are preferred:
(a): 50 to 99.9% by weight
(b): 50 to 00.1% by weight for 100 parts by weight of (a+b).

The combustible creosote-destroying agent according to the invention may appear in any desired shape, either regular such as cubes, cylinders, polygons of any type, spheres, or random shape. In the case of fireplaces and wood stoves normally operated with wood, the shape of a log, either large or small, is preferred both for aesthetic and practical reasons. The size of the log may be variable, but will preferably be that of the logs normally used in fireplaces and wood stoves, typically between 6 and 14 inches in length.

BEST MODE OF CARRYING OUT THE INVENTION

The invention is described here in a preferred embodiment. The preferred embodiment involves the use of a creosote and soot destroying chemical composition comprised of the following components, proportions given by weight per volume:

| (a) | Soda Bicarbonate | 400# | 17.4% |
| (b) | Aracoal Anthratec | 400# | 17.4% |
| (c) | 200 Volclay Bentonith | 200# | 8.7% |
| (d) | Talc | 50# | 2.2% |
| (e) | Copper Oxychloride | 200# | 8.7% |
| (f) | #200 Olivine Sand | 1000# | 43.5% |
| (g) | Kerosene | 2.5 gal. = 12# | 0.5% |
| (h) | Cedar Sawdust | 35# | 1.5% |

The process for manufacturing aggregates according to the present invention may be of the same type as that conventionally used when manufacturing a sawdust or compressed log, except that the combustible material (a) is admixed with the creosote destroying agent during the manufacturing process. The resulting mixture of (a+b) may be press-molded, extruded or poured into molds. The constituents of the aggregate are preferably distributed in a substantially homogeneous manner, although the agent (b) can also be arranged at the center or as successive layers.

The aggregate, for example a log, can thereafter be wrapped up, whenever desired or treated in some way to be more easily ignited.

The following is a non-limiting example of the invention.

EXAMPLE 100 parts by weight of dry sawdust of 1 mm average diameter are admixed with 6 parts by weight of a mixture by equal parts by weight of copper chloride and trisodium phosphate. The mixture is extruded and extrudates of about 6 inches in length and 4 inches in average diameter are cut therefrom. The extrudates are then cut into ¼ rounds. These extrudates have the aspect of "split wood" log pieces. These "split wood" pieces are then bundled together and placed in cardboard boxes, which is not compulsory.

A "split wood" piece of the above type is added to an existing fire burning in a wood stove or fireplace. The best results are obtained when adding the combustible material to an already existing fire. The log is ignited and burns with flame for about 4 hours, depending upon the burn rate of the existing fire. The catalytic agent is thus released in a heated gaseous form, whereby the agent treats the chimney and destroys the deposits therein.

INDUSTRIAL APPLICABILITY

The invention has applicability to the field of processed solid fuel compositions, and more particularly to processed fireplace logs incorporating agents for destroying creosote and soot within flue ducts and chimneys of fireplaces, solid fuel stoves and other heating devices.

In compliance with the statute, the invention has been described in language more or less specific as to chemical composition and structural features. It is to be understood, however, that the invention is not limited to the specific features and chemical compositions shown or described, since the means, chemical concentration and construction shown or described comprise preferred forms of putting the invention into effect.

Additionally, while this invention is described in terms of being used for destroying creosote and soot within flue ducts and chimneys of fireplaces, solid fuel stoves and other heating devices, it will be readily apparent to those skilled in the art that the invention can be adapted to other uses for creosote and soot removal as well, and therefore the invention should not be construed as being limited to destroying creosote and soot within flue ducts and chimneys of fireplaces, solid fuel stoves and other heating devices. The invention is, therefore, claimed in any of its forms or modifications within the legitimate and valid scope of the appended claims, appropriately interpreted in accordance with the doctrine of equivalents.

I claim:

1. A compressed and processed solid fuel composition for destroying creosote in chimney flues consisting of:
    a solid particulate combustible cellulosic material (a);
    a creosote-destroying chemical agent (b) chosen from the group consisting of metallic chloride of sodium, potassium, zinc, tin, copper or ammonium phosphate, trisodium phosphate, ammonium salt and mixtures thereof;
    optional additional material (c) selected from the group consisting of: (i) carriers and (ii) aesthetic agents and odor enhancers; and
    relative proportions of (a) and (b) are, by weight, from 50 to 99.9% of (a) and 50 to 00.1% of (b).

2. The processed solid fuel composition according to claim 1, in the form of a log, said log being compressed at from 10,000 to 20,000 psi.

3. The processed solid fuel composition according to claim 2, wherein said log is 6 to 14 inches in length.

4. The processed solid fuel composition according to claim 1, having an autonomous combustion time from 30 minutes to 4 hours.

5. The processed solid fuel composition according to claim 1, wherein the solid particulate combustible cellulosic material (a) consists entirely of wood particles.

6. The processed solid fuel composition according to claim 1, wherein the agent (b) comprises a metallic chloride and trisodium phosphate in a proportion of 10-90% by weight of the former and 90-10% by weight of the latter.

7. A process for manufacturing a compressed and processed solid fuel composition for destroying creosote within chimney flues, consisting of the steps of:

admixing a solid particulate combustible cellulosic material (a), and a chemical catalytic agent that disaggregates creosote (b), whereby the relative proportions by weight are 50-99.9% of (a), and 50-00.1% (b) for 100 parts of (a+b), wherein the resultant mixture consists of (a+b+c), where (c) is optional additional material selected from the group consisting of: (i) carriers and (ii) aesthetic agents and odor enhancers; and shaping and compressing the resultant mixture into a generally elongated log.

8. The process according to claim 7, wherein (a) and (b) and (c) are admixed and the resulting mixture is extruded into a log at a pressure of from 10,000 to 20,000 psi.

9. A method for forming a solid fuel composition for destroying creosote within a chimney flue of a solid fuel burning appliance, consisting of the steps of:

admixing a solid particulate combustible cellulosic material (a) and a creosote-destroying chemical agent (b) and optional additional material (c) selected from the group consisting of (i) carriers and (ii) aesthetic agents and odor enhancers;

combining said cellulosic material (a) and chemical agent (b) and additional material (c) to form a substantially homogeneous aggregate; and forming and compressing said aggregate to render it into a solid elongated form.

10. A process for destroying creosote within a chimney flue of a solid fuel burning appliance, said flue having an undesirable accumulation of creosote deposits therein, comprising the steps of:

inserting a creosote-destroying processed solid fuel composition into an existing fire within said appliance, said processed solid fuel composition comprised of:

a. a solid particulate combustible cellulosic material;
b. a chemical agent that disaggregates creosote; and
c. optional additional material selected from the group consisting of: (i) carriers and (ii) aesthetic agents and odor enhancers;

providing ignition and combustion of said solid fuel within said appliance;

releasing said chemical agent in a gaseous form within said flue; and providing a substantially constant temperature, whereby effectiveness of said chemical agent is optimized thereby disaggregating and destroying the creosote deposits.

11. The process according to claim 10, wherein the processed solid fuel composition is in the form of at least one log.

* * * * *